May 29, 1956
W. E. DECKER
2,748,255
AUTOMOTIVE VEHICLE HEADLIGHT
Filed May 27, 1953
2 Sheets-Sheet 1
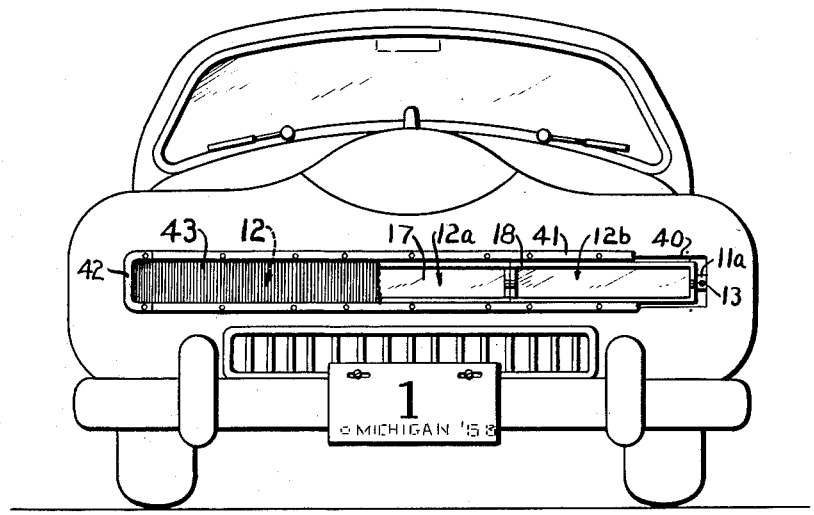
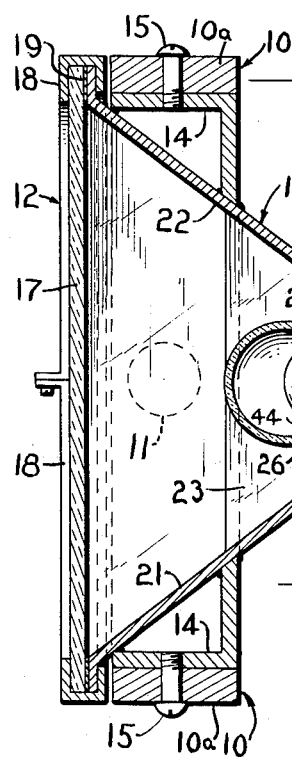
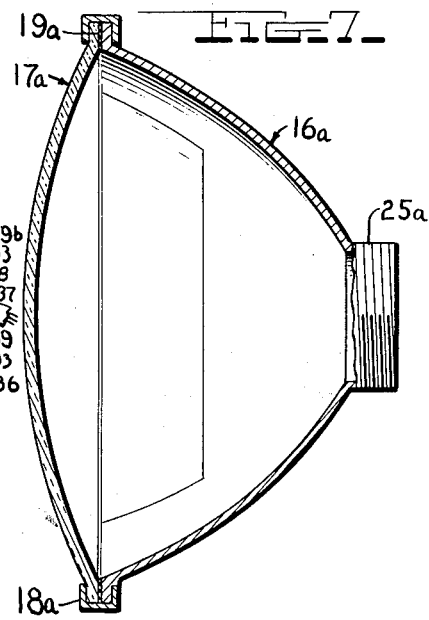
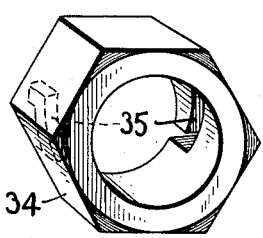
INVENTOR
William E. Decker
BY Roy A. Plant
ATTORNEY

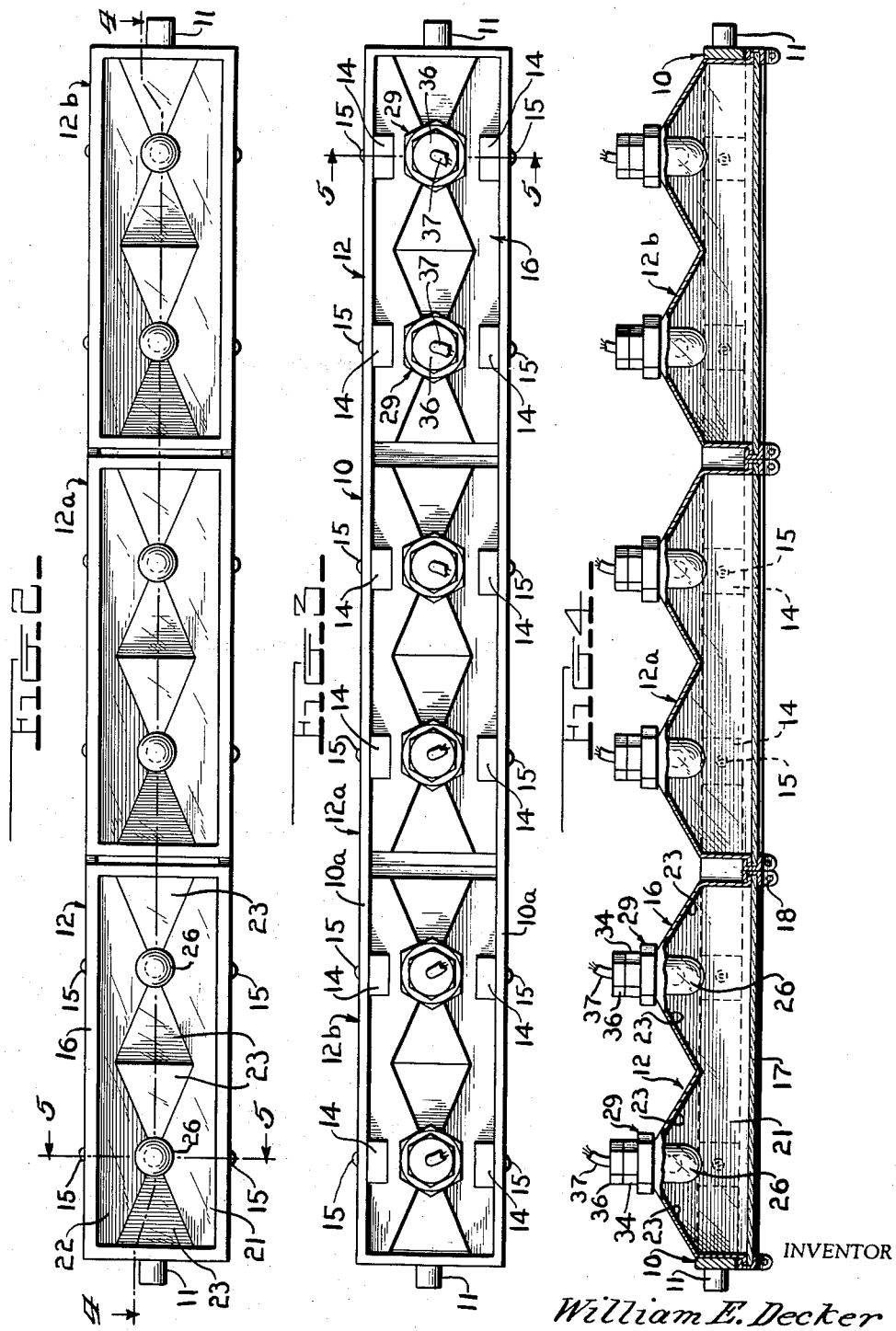

United States Patent Office 2,748,255
Patented May 29, 1956

2,748,255

AUTOMOTIVE VEHICLE HEADLIGHT

William E. Decker, Battle Creek, Mich.

Application May 27, 1953, Serial No. 357,811

6 Claims. (Cl. 240—7.1)

The present invention relates broadly to lighting equipment, and in its specific phases to headlights for automotive vehicles and the like.

Present day automobile headlights leave much to be desired with respect to uniform distribution of bright light over the full width of the road and lateral dispersion of light to better illuminate the edges of the road, and ditches, all with minimum glare for approaching traffic.

To overcome part of the above deficiencies, it has been proposed to have a row of bulbs, and individual reflectors limited to one bulb, within and as part of an elongated unit casing assembly extending across the front of the automobile. While this idea, if properly executed, may solve part of the basic problem of getting more light on the road, it does not solve the lateral light dispersion problem and also presents the undesirable element of excessive expense in case of injury to the headlights in accidents, as any blow which would render even one end of the elongated headlight unfit for repair would necessitate renewal of the entire light. It was a recognition of these and other problems and difficulties in the automotive lighting field which led to the conception and development of the present invention.

It is accordingly among the objects of the present invention to overcome the undesirable characteristics above mentioned by constructing a headlight of the elongated type, with multiple light bulbs, from substantially identical sections detachably mounted end-to-end upon a common support and utilizing special reflectors facilitating sidewise dispersion of light plus adequate light on the road itself. This sectional construction permits the renewal of any section or sections which may become damaged, without renewing any section or sections not damaged. Then, too, the sections may be manufactured in substantially identical form and any desired number of said sections may be embodied in a headlight according to the length required for the latter. For most automobiles, three sections, each containing two bulbs and associated double reflectors are preferred and are adequate, but for extremely wide trucks and tractor-trailer combinations, more sections may be employed, and for "bantam size" cars two sections will suffice. Also, a two-section light could well be employed centrally below or above a main three-section light, as an auxiliary, if desired. In a three-section, six-bulb light, four of the bulbs may be employed to furnish the normal driving beam, and the other two may act as parking lights, fog lights, or turning signals, each of these two bulbs performing any or all of these functions, according to the circuits and switches used, and even as headlights along with the other bulbs by merely turning them on as parking lights.

Another object of the invention is to provide the support, above mentioned, in the form of an elongated rectangular frame into which the headlight sections are fitted in end-to-end relation, and to which they are detachably secured.

Another object is to provide for tiltably mounting the light unit supporting frame to dispose the projected fanlike beam at a safe and legal angle to the road.

Another object is to provide a dust tight construction, hermetically sealed if desired, which will nevertheless permit easy replacing of bulbs and proper bulb adjustment for focusing.

Still another object is to provide a novel construction which can be expeditiously and economically manufactured, as well as installed, and may therefore be profitably marketed at a reasonable price.

Still further objects and advantages of the present invention will appear as the description proceeds.

To the accomplishment of the foregoing and related ends, the invention, then, consists of the headlight apparatus hereinafter fully described and particularly pointed out in the claims, the annexed drawings and the following description setting forth in detail certain means for carrying out the invention, such disclosed means illustrating however but several of various ways in which the principle of the invention may be used.

In the annexed drawings:

Figure 1 is a front elevation, partly broken away, showing an automobile equipped with the improved headlight of the present invention.

Figure 2 is an enlarged front elevation of a three unit headlight with the transparent front plates or lenses removed.

Figure 3 is a rear elevation of the assembly shown in Figure 2.

Figure 4 is a horizontal sectional view taken on line 4—4 of Figure 2 looking in the direction of the arrows.

Figure 5 is a further enlarged vertical sectional view taken on the line 5—5 of Figures 2 and 3 looking in the direction of the arrows.

Figure 6 is a perspective view of one of the bulb-focusing collars.

Figure 7 is a vertical sectional view omitting the various mounting details and specifically showing a reflector and front plate or lens having different shapes from those shown in the other views.

The headlight construction shown in the drawings will be rather specifically described for ease of understanding the principles involved, but it is to be understood that some variations in addition to those illustrated, may well be made to the headlight construction without departing from the obvious scope and spirit of the invention.

A horizontally elongated supporting frame 10, Figure 3, is provided with trunnions 11 on its ends respectively, said trunnions being receivable in suitable trunnion bearings, one of which is shown at 11a in the right hand portion of Figure 1. Three substantially identical headlight sections 12, 12a, and 12b are carried by the frame 10, and the trunnions and the trunnion bearings allow tilting of said frame and sections to direct the projected beam at a safe and legal angle to the road. After adjustment, the trunnions are locked in place by any suitable means, such as set screws 13.

In the construction shown, the three sections 12, 12a, and 12b fit snugly into the frame 10 in end-to-end relation and are provided with brackets 14, Figures 3 and 5, abutting the inner sides of the side bars 10a of said frame, said brackets and side bars being secured together by screws 15. Removal of these screws of any section will permit removal of said section for replacement, if damaged.

As all of the sections 12, 12a, and 12b are substantially identical, a description of the section 12 and application of the reference characters used in said description to this one section 12, will suffice. This section possesses a horizontally elongated casing 16, Figure 4, closed at its front by a transparent plate or lens 17. This plate or lens may be permanently and hermetically sealed to the casing 16 or may be secured by a clamping rim 18, Figure 5, a gasket 19 being employed to exclude moisture and dust.

The casing section 12 is equipped with two bulbs 20 and with reflecting means associated with said bulbs. There is one longitudinal forwardly declined reflecting surface 21 under the two bulbs, one longitudinal forwardly inclined reflecting surface 22 over said bulbs, and two forwardly diverging vertical reflecting surfaces 23 at the opposite sides of each bulb. The surfaces 21 and 22 extend from end to end of the casing 16 and extend to the plate or lens 17. The surfaces 23 terminate in rearwardly spaced relation with this plate or lens 17, allowing the bulb of one reflector to also illuminate the reflector of the other bulb somewhat, should the bulb of the latter burn out. Also, the innermost of the bulbs of the outer casing sections 12 and 12b could well remain normally extinguished and be illuminated only to act as a fog light, as a parking light, as a turning signal, or even all of these in turn. This, however, would not apply to the central section 12a. The bulb to act as a fog light, a parking light, or a turn signal would preferably be amber colored, or masked with an amber colored mask, or the light container hereinafter described would be amber colored.

At the centers of the two reflector portions, the casing 16 is formed with two openings 24 respectively, Figure 5, and around these openings there is a rearwardly projecting externally threaded flange 25. A transparent, relatively short but substantially test-tube shaped bulb container 26 is inserted forwardly into the opening 24 and is provided with an external rib 27 at the rear end of the flange 25, a sealing gasket 28 or a permanent sealing medium being interposed between said rib and flange end. A sleeve 29 secures the bulb container 26 in place as explained below.

The sleeve 29 has a relatively large front end 29a, a longitudinally slotted relatively small rear end 29b, and a forwardly facing shoulder 29c joining said large and small ends. The large sleeve end 29a is threaded upon the flange 25 of the casing 16 and the shoulder 29c is disposed behind the bulb container 26, a gasket 30 being interposed between said shoulder and container. The large end 29a of the sleeve 29 is externally hexagonal to allow use of a wrench in tightening it, and when tightened, said sleeve tightly secures the container 26 in place. The entire interior of the casing 16 is thus tightly sealed against entrance of moisture and dust.

The rear of the small end 29b of the sleeve 29 is open and a bulb holding socket 31 is forwardly inserted into said small sleeve end. This bulb holding socket 31 has radial studs 32 at its periphery and the small rear end 29b has longitudinal slots 33 through which said studs 32 project. A bulf focusing collar 34, Figures 5 and 6, surrounds the small end 29b of sleeve 29 and is formed with internal helical grooves 35 receiving the outer ends of the studs 32. By turning this collar 34, the bulb 20 is slid forward or back, under guidance of studs 32 in slots 33, as required for focusing. The collar 34 is then locked in adjusted position in the manner explained below.

A cap 36 is threaded on the rear extremity of the small tube end 29b and normally abuts the rear end of collar 34. The exterior of this cap is hexagonal for engagement by a wrench and when said cap is tightened it tightly clamps the focusing collar 34 against the shoulder 29c of the sleeve 29. This focusing collar is also externally hexagonal for engagement by a wrench. To focus the bulb, it is only necessary to loosen the cap 36, turn the focusing collar 34 in the proper direction until the desired focusing is accomplished, and re-tighten said cap. This cap 36 is apertured to receive the cable 37, the wires 38 of which are suitably connected to contacts 39 for engagement by the usual contacts of the bulb 20.

In Figure 7, a casing 16a is shown, with the mounting details and bulb details omitted, and which may be employed instead of the casing 16. This casing 16a would have its reflecting surfaces formed as sections of a parabola. In this same view, a front plate or lens 17a is shown of concavo-convex form. Either of the plates or lenses 17 and 17a may be plain or of ribbed or other suitable design.

Any required number of the headlight sections may be assembled in a supporting frame 10 of proper length. For most purposes, the entire assemblage will be mounted in a recess 40, Figure 1, in the front of an automobile, or the like, and at any desired location. Ornamental moulding 41 may be provided around the recess 40 and this moulding may have removable sections 42 at its ends for giving access to the tilt adjusting set screws or the like 13, when the headlight must be tilted up or down for proper projection of the light beam.

Whenever a bulb burns out, removal of the proper sleeve 29 permits access to the old bulb and its socket without disturbing the setting of the focusing collar 34. Suitable provision is of course made for giving access to the various sleeves 29 from the rear of the recess 40, for example, removable plates (not shown) at the back wall of the recess if the automobile manufacturer should decide to close the area back of the headlight assembly, although same normally is not necessary and is not a part of the present invention.

From the foregoing, it will be seen that novel and advantageous provision has been made in the headlight field for attaining the desired ends which have been set forth. However, attention is again invited to the possibility of making variations within the spirit and obvious scope of this invention. For example, each casing, front plate or lens, and the bulb container could well be formed from glass as a single unit of what is commonly referred to as a "sealed beam" unit, but which in this invention would have more than one light bulb, and it is intended that the drawings be considered as diagrammatically including this construction. The multiple bulb units could also be provided with a single elongated cover lens 43, Figure 1, if desired, and a small increase in reflecting surface can be attained by means of a supplemental reflector 44, Figure 5, which can be fitted over the bulb 20 before same is pushed into bulb container 26, both of which are part of the present invention.

Other modes of applying the principle of my invention may be employed instead of those explained, change being made as regards the headlight apparatus herein disclosed, provided the means stated by any of the following claims or the equivalent of such stated means be employed.

I therefore particularly point out and distinctly claim as my invention:

1. In a headlight, a reflecting casing having an opening in its rear side and an externally threaded flange projecting rearwardly around said opening, a rearwardly open test-tube shaped bulb container forwardly inserted through said opening and having an external rib behind the rear edge of said flange, a sleeve having a large front end, a small rear end, and a shoulder joining said large and small ends, said large sleeve end being threaded upon said flange and disposing said shoulder to hold said bulb container in place, said small sleeve end having a longitudinal slot, a bulb holding socket within said small sleeve end and having a radial stud projecting through said slot, a manually rotatable focusing collar surrounding said small sleeve end and having a helical groove receiving the projecting end of said stud, whereby turning of said focusing collar will positionally adjust said bulb holding socket for bulb focusing, and locking means threaded on said small sleeve end behind said focusing collar for frictionally clamping said collar against said shoulder after adjustment.

2. A structure as specified in claim 1; said locking means consisting of a cap closing the rear extremity of said sleeve and apertured for the required current conductor.

3. A headlight comprising a horizontally elongated support, a multiplicity of multiple-light individual headlight sections which are substantially identical with each other, said sections being disposed end to end along said support, means detachably securing said headlight sections to said support for individual removal therefrom and including trunnion means for tilting said elongated support which has an elongated frame with side and end bars between which said individual headlight sections are fitted and separably secured, said headlight sections having mounting brackets on their side edges and said securing means comprising screws extending through the side bars of said elongated frame into said brackets on said sections, each of said sections having two electric light bulbs with substantially parallel beam associated twin reflectors shaped at their adjacent edges so that a substantial portion of each reflector is normally illuminated directly by the bulb in the associated reflector.

4. In a headlight, a horizontally elongated casing having a transparent front, at least two separate bulb socket means in the rear portion of said casing with each of said bulb socket means adapted to hold a single bulb, and with said separate socket means spaced apart longitudinaly of said casing, a bulb for each of said socket means, said casing having one reflecting surface above said bulbs and inclined forwardly to said transparent front, said casing having another reflecting surface under said bulbs and declined forwardly to said transparent front, said casing also having relatively small, sidewise sloping, vertically arranged reflecting surfaces between said first two reflecting surfaces with said vertical reflecting surfaces which are between said bulbs terminating in rearwardly spaced relation to said transparent front, each said bulb socket means including a transparent, substantially uniform wall thickness, test-tube shaped bulb container having a flanged open rear end with the front end extending between said reflecting surfaces, said bulb for each socket means operably fitting into the corresponding test-tube shaped bulb container from the rear end of same, and a truncated cone shaped reflector around said bulb and within said bulb container, said small reflecting surfaces between said bulbs permitting a substantial portion of the reflecting surfaces for either bulb to be directly illuminated by the other bulb when same is lighted, whereby said bulbs and reflectors project substantially parallel light beams in forward direction while said relatively small vertically mounted reflecting surfaces facilitate sidewise dispersion of light from said bulbs.

5. In a headlight, a sealed multiple bulb substantially parallel beam reflecting casing having for each bulb a transparent substantially uniform wall thickness rearwardly open test-tube shaped bulb container, each said bulb container projecting forwardly into the rear portion of said casing, an electric light bulb in each of said containers, and means at the rear end of each said container for mounting one of said bulbs in same, said mounting means including manually operable cam means for adjusting the bulb forwardly or rearwardly in said container for focusing in said casing.

6. In a headlight, a reflecting casing having an opening in its rear side and an externally threaded flange projecting rearwardly around said opening, a rearwardly open test-tube shaped transparent bulb container having substantially uniform thickness wall, said container being forwardly inserted through said opening and having an external rib behind the rear edge of said threaded flange, a sleeve having a large front end, a small rear end and a shoulder joining said large and small ends, the large end of said sleeve being threaded upon said threaded flange of said casing with said shoulder acting to hold said bulb container in place, and gripped to the rear end of said externally threaded flange, a bulb holding socket within said small sleeve end, and a cam means for adjusting said bulb holding socket forwardly or rearwardly, and means for then locking it in set position.

References Cited in the file of this patent
UNITED STATES PATENTS

| | | |
|---|---|---|
| 1,033,253 | Kitchen et al. | July 23, 1912 |
| 1,541,376 | Nock | June 9, 1925 |
| 1,543,230 | O'Lear | June 23, 1925 |
| 1,741,888 | Transom | Dec. 31, 1929 |
| 1,746,508 | Wrenn et al. | Feb. 11, 1930 |
| 1,861,883 | Russell | June 7, 1932 |
| 2,109,748 | Klein | Mar. 1, 1938 |

FOREIGN PATENTS

| | | |
|---|---|---|
| 1,011,658 | France | Apr. 9, 1952 |